United States Patent
Ito et al.

(10) Patent No.: US 6,850,087 B2
(45) Date of Patent: Feb. 1, 2005

(54) METHOD OF TESTING LIQUID CRYSTAL DISPLAY CELLS AND APPARATUS FOR THE SAME

(75) Inventors: Minoru Ito, Saitama-ken (JP); Nobuo Konda, Singapore (SG)

(73) Assignee: Kabushiki Kaisha Toshiba, Tokyo (JP)

( * ) Notice: Subject to any disclaimer, the term of this patent is extended or adjusted under 35 U.S.C. 154(b) by 104 days.

(21) Appl. No.: 10/409,047

(22) Filed: Apr. 9, 2003

(65) Prior Publication Data

US 2003/0193347 A1 Oct. 16, 2003

(30) Foreign Application Priority Data

Apr. 10, 2002 (JP) .................................... P2002-108048

(51) Int. Cl.$^7$ .............................................. G01R 31/00
(52) U.S. Cl. ...................................... 324/770; 345/96
(58) Field of Search ............................. 324/770, 727, 324/765, 512, 527, 763, 158.1; 345/96, 98, 99; 702/117, 118, 124, 189

(56) References Cited

U.S. PATENT DOCUMENTS 5,339,093 A * 8/1994 Kumagai et al. ............. 345/89
6,734,840 B2 * 5/2004 Fukutoku et al. ............. 345/96

* cited by examiner

*Primary Examiner*—David Zarneke
*Assistant Examiner*—Trung Q. Nguyen
(74) *Attorney, Agent, or Firm*—Pillsbury Winthrop LLP

(57) ABSTRACT

A plurality of liquid crystal display cells in a test unit are driven to display a series of test image patterns. When some of the liquid crystal display cells are judged to function poorly or completely good, they are controlled to display a predetermined image pattern, so that an inspection person can stop further testing them and focus testing on other liquid crystal display cells. Where some of the other liquid crystal display cells are then judged to function poorly or completely good, they are controlled to display the same pattern as such a predetermined image pattern. Thus, since the inspector can test such liquid crystal display cells as required to check, the testing efficiency is significantly improved.

7 Claims, 4 Drawing Sheets

METHOD OF TESTING LIQUID CRYSTAL DISPLAY CELLS AND APPARATUS FOR THE SAME

FIELD OF THE INVENTION

This invention relates to a method of testing liquid crystal display cells, and an apparatus for the same.

BACKGROUND OF THE INVENTION

Recently, the production of liquid crystal display (LCD) cells with a diagonal length around 5 cm has increased as mobile phones have come into wide use and their businesses expanded. The LCD cells of this sort are provided with a thin film transistor (TFT) driving system to comply with high resolution requirement.

Each LCD cell used for mobile phones or compact information terminals is around 5 cm in diagonal length, and a lot of the cells are formed on a mother glass substrate. As such, more of these cells may be cut out of a mother glass substrate than cells that are used for ordinary personal computers. More than 90 of the 5 cm cells may be cut out of a 400 mm×500 mm mother glass substrate, as opposed to 4 cells with a diagonal length around 25 cm.

Ordinarily, thin film transistor (TFT) array and counter substrates formed on glass substrates are put together to make a mother substrate of LCD cells. Each cell of a predetermined size is then cut out from the mother glass substrate. A liquid crystal material is injected into each LCD cell, one by one, and its injection inlet is sealed. Further, polarizers are put on the outer surfaces of the glass substrates. The cell is then subjected to testing or inspection.

Testing is carried out by inspectors' visual (eye) observations. They attempt to detect defects from test image patterns on the LCD cell enabled by driving signals. In order to precisely detect multiple modes of defects, the cell is driven to display various test image patterns.

Where the number of the LCD cells cut out from the mother substrate of LCD cells increases, assembling steps of injecting liquid crystal materials into the LCD cell, putting the polarizers on the substrate, testing the LCD cells, etc. are carried out not, for each cell at a time, but for a number of the LCD cells collected together in parallel as a group.

All the LCD cells are, however, subjected to such testing steps as a group, even if one of them fails to pass previous testing steps due to defects and no further testing is necessary for it. Thus, the efficiency of testing cannot be improved.

Further, prior to the visual inspection stated above, automatic screening of the LCD cells may be done by an image data processor, or an array tester may be used to detect electrical defects of driving line configurations formed on a TFT array substrate before the TFT substrate is incorporated into the cells.

Where poor and good LCD cells, clearly judged in the automatic screening, are subjected to visual inspection together, the efficiency of such visual inspection cannot be improved either.

SUMMARY OF THE INVENTION

Accordingly, an object of the present invention is to provide an improved, and more efficient, method of testing LCD cells and an apparatus for the same.

According to one aspect of the present invention, the method of testing LCD cells includes the steps of preparing a test unit of LCD cells and displaying a test image pattern on them.

An inspector can judge from the test image pattern displayed on the LCD cells whether the LCD cells function properly or not.

The method further includes the steps of displaying a predetermined image pattern on one or more of the LCD cells which have been judged to be poor in the judging step, and testing other LCD cells which display the test image pattern.

According to another aspect of the invention, a method of testing LCD cells includes the steps of detecting an identification number of a test unit of LCD cells, reading in judging data stored in a memory system as to whether the LCD cells with the identification number are poor or good in function, setting up the test unit at an LCD cell drive control system, and providing the LCD cell drive control system with control signals in response to the judging data.

An inspector can stop testing the poor LCD cells, displaying a predetermined image pattern on the poor ones, and further test the good ones of the LCD cells displaying a different test image pattern from the predetermined image pattern.

The method of testing LCD cells of the present invention further includes the steps of supplying a control system with testing results of the testing step which indicate judging data as to whether the good ones of the LCD cells are still good or not, sending control signals in response to the testing results from the control system to the LCD cells which have been determined to be not good in the testing step to display different image pattern from the test image pattern, and further testing the LCD cells which have been determined to be still good and display the test image pattern.

The method of testing LCD cells further includes the steps of electrically testing the test unit of the LCD cells and storing testing results obtained from the electrically testing step in the memory system.

The method of testing LCD cells further includes the steps of image-processing testing the test unit of the LCD cells and storing testing results obtained from the image-processing testing step in the memory system.

According to yet another aspect of the present invention, an LCD cell testing apparatus includes an inspection system to drive and control a test unit of LCD cells, a control system to send drive control signals to the test unit of LCD cells, and an input system to provide the control system with judging data as to whether the LCD cells are poor or good, wherein the control system sends the drive control signals in response to the judging data.

The LCD cell testing apparatus further includes a detection system to detect a serial number of the test unit, wherein the input system reads out the judging data with the serial number from the memory system and inputs the same to the control system.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED EXPLANATION OF THE PREFERRED EMBODIMENTS

An LCD cell testing apparatus of an embodiment according to the present invention will be explained below with reference to the attached drawings.

Figure 2:
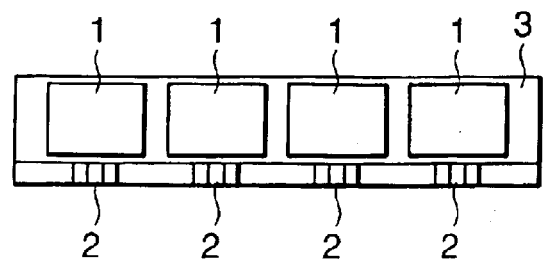
FIG. 2 is a schematic plan view of a test unit of LCD cells of the invention.

LCD cells subjected to test are described to begin with. A test unit 3 includes a plurality of the LCD cells 1 disposed in parallel in a line as shown in FIG. 2. The LCD cells are connected to outer lead bonding pads 2 to which driving control signals are supplied. A serial identification (ID) number is put on the unit 3 of the LCD cells 1. The ID number is preferably recognizable as an image, such as a numerical code representation.

Figure 1:
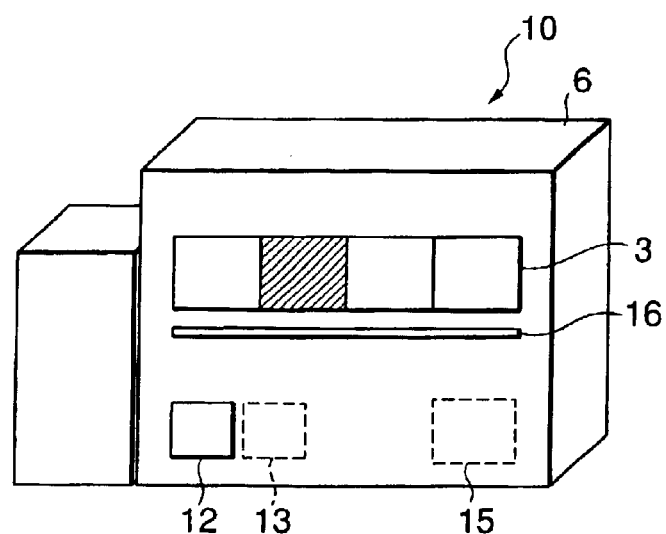
FIG. 1 schematically shows an LCD cell testing apparatus of the present invention.
Figure 3:
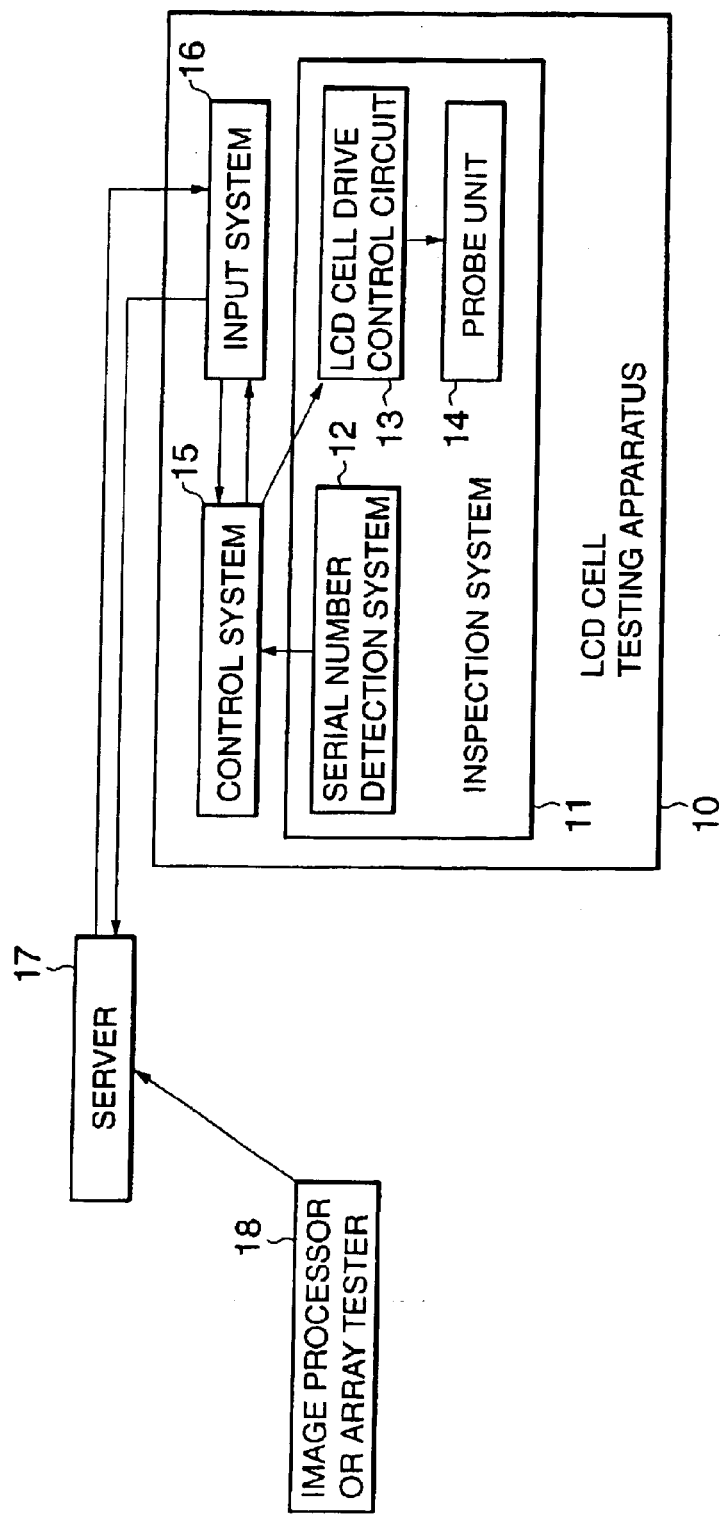
FIG. 3 is a block diagram of the LCD cell testing apparatus of the invention.

FIG. 1 schematically shows an embodiment of an LCD cell testing apparatus according to the present invention and FIG. 3 is its block diagram. The LCD cell testing apparatus 10 includes an inspection system 11, a control system 12 and an input system 16. The inspection system 11 receives and inspects the test unit 3 of the LCD cells 1. The control system 15 provides control signals to the inspection system 11. The input system 16 inputs testing results to the control system as will be explained below in detail. The unit 3 of the LCD cells 1 is loaded into the LCD cell testing apparatus 10 to set display surfaces of the unit 3 of the LCD cells on a front panel of the testing apparatus 10 so that an inspector can make direct, visual observations of them.

The inspection system 11 has a prove unit 14 to supply the test unit 3 of the LCD cells 1 with drive control signals and an LCD cell drive control circuit 13 to provide the probe unit 14 with a drive control signal for each LCD cell. The inspection system 11 may further include a serial number detection system 12 to cooperate with screening equipment 18 of an image data processor, an array tester, etc., which will be explained latter in detail.

The control system 15 and the input system 16 may consist of a personal computer and a touch panel (screen), used as a monitor of inspection results as well, respectively. The probe unit 14 may include probes to be connected to outer lead bonding pads 2 of the test unit 3 to provide the drive control signal to each LCD cell 1. The serial number detection system 12 may be an image data processor which consists of optical units, e.g., a CCD camera, and an image data processing unit.

The LCD cell drive control circuit 13 generates drive and control signals for the LCD cells 1 in response to the control signal supplied from the control system 15, e.g., horizontal and vertical synchronization signals and image data, which are supplied to the LCD cells 1 through the probe unit 14.

Figure 4:
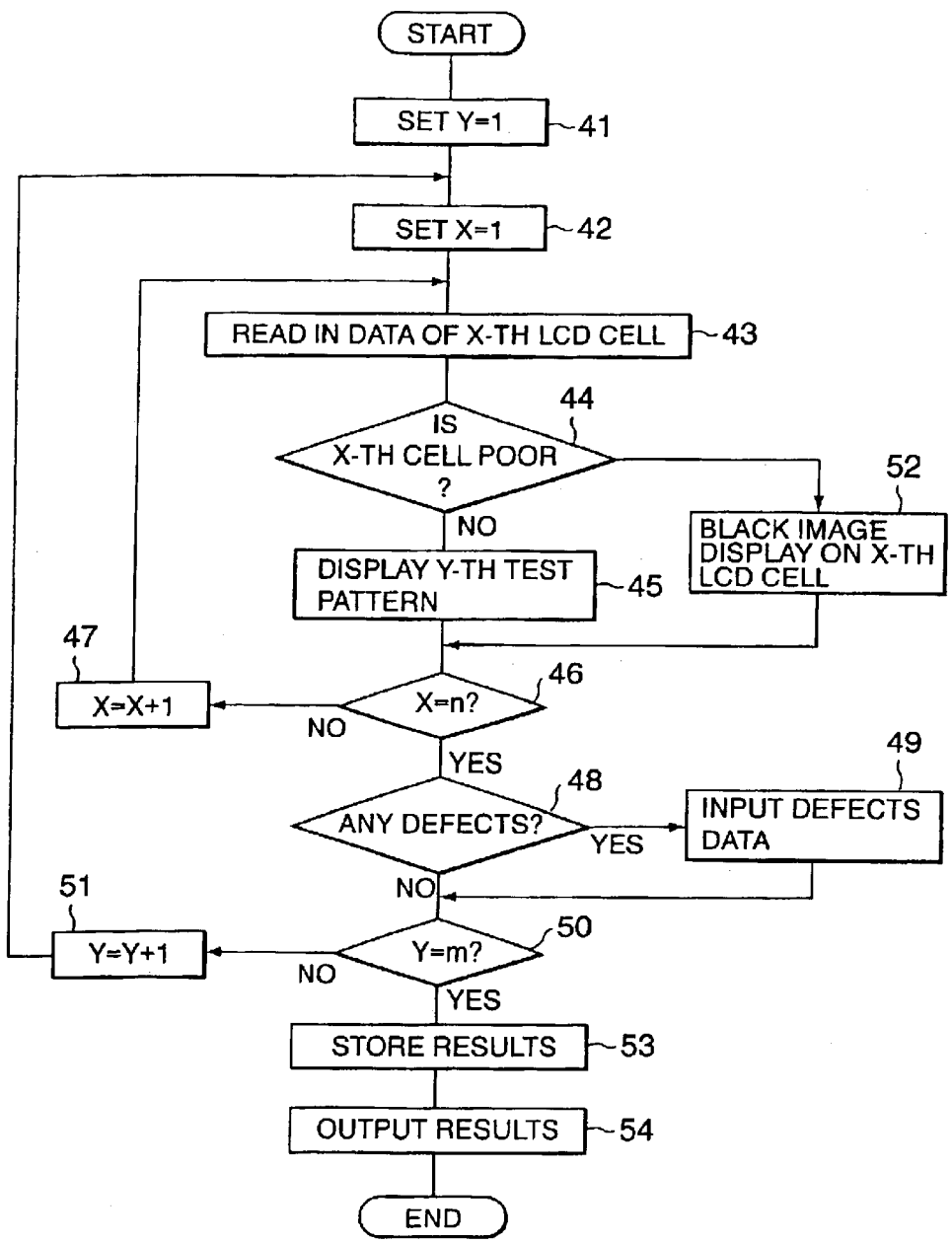
FIG. 4 is a flow chart of a method of testing LCD cells of the invention.

A method of testing LCD cells carried out in the LCD cell testing apparatus 10 will be described below with further reference to the flow chart shown in FIG. 4.

First, the test unit 3 of the LCD cells is connected to the probe unit 14. A first one of "m" kinds of test display patterns (e.g., "m"=20) is selected at Step 41. A first LCD cell in the test unit 3 of "n" LCD cells is selected, i.e., "X=1" is set at Step 42. The control system 15 supplies the LCD cell drive control circuit 13 with a control signal in response to the information selected at Steps 41 and 42. The control system 15 reads out the data of the first LCD cell from the hard discs at Step 43. The control system 15 then judges from the data whether the first LCD cell functions poorly or not. If it is poor, the control system 15 selects a control signal to generate a predetermined display pattern (e.g., a black image display) or an instruction for the first LCD cell to turn off and provides it to the LCD drive control circuit 13 at Step 52. If it is not poor, the LCD cell drive control circuit 13 sends the drive control signal to driving circuits provided in the LCD cells, so that the first LCD cell displays the first test image pattern (e.g., color bar pattern) at Step 45.

Next, since X=1 at Step 46 and X=X+1 is set at Step 47, a second LCD cell of the test unit 3 displays the same test image pattern as the first one. Thus, these operations are repeated until X=n, i.e., n-th LCD cell in the test unit 3 is enabled to display the same test image pattern.

The inspector makes a series of visual observations of the test image pattern displayed by all the LCD cells of the test unit 3 and checks at Step 48 if each LCD cell has any defects. If the inspector 25 recognizes defects of an LCD cell, he or she inputs its number through the touch panel 16 at Step 49. Thus, testing result data are provided to the control system 15 and memory devices in the control system 15, such as hard discs etc., store the data as to whether the LCD cells under test have any defects or not.

Since the first test image pattern has finished (i.e., Y=1 at Step 50), a second test image pattern (i.e., Y=2) is set at Step 51. The operation returns to Step 42 where the first LCD cell is selected. The control system 15 reads out the data of the first LCD cell from the hard discs at Step 43. The control system 15 then judges from the data whether the first LCD cell functions poorly or not at Step 44. If it is poor, the control system 15 selects a control signal to generate a predetermined display pattern (e.g., a black image display) at Step 52 and sends it to the LCD drive control circuit 13. If it is good, however, the control system 15 selects another control signal to generate a second test image pattern at Step 45 and sends it to the LCD drive control circuit 13. In this way, the control system 15 selects a control signal to generate a next test image pattern for the continuing inspection of the good LCD cell, or another control signal to generate a predetermined display pattern for the poor LCD cell. These operations are repeated until an n-th LCD cell has been inspected. It is understood that those skilled in the art of data handling can easily apply ordinary data processing techniques for the control system 15 to execute such selections of the control signals.

Where the inspector judges that an LCD cell of the test unit 3 functions poorly with respect to the first test image pattern the LCD cell is set not to display the second, or any subsequent test image patterns. Instead, it continues to display the predetermined image pattern (black image). As a result, the inspector can skip or stop, from the time of the second test image pattern on, any further tests for the poor LCD cell judged at the time of the first test image pattern. Thus, he or she can examine only the remaining LCD cells of the test unit 3, so that the test efficiency increases significantly. If "Y=m", e.g. "Y=20", the 20-th test image pattern is finally displayed on the last one of the remaining LCD cells at Step 50, testing results are stored and outputted at Steps 53 and 54, respectively.

As described, when once an LCD cell has been determined to be poor in function at any step of "Y=i", i=1, 2, 3, . . . , m−1, the LCD cell continues displaying the predetermined image pattern from the step of "Y=i+1" to that of "Y=m", and the inspector can skip it.

According to the first embodiment of the present invention, since the inspector can stop testing an LCD cell which has been judged to function poorly in the previous step, he or she can cast a glance at it and continue examining only the LCD cells which are necessary to subsequently check. As a result, the testing efficiency has been considerably improved.

Now, another embodiment of the invention will be explained below with reference to a flow chart shown in FIG. 5. A method of testing LCD cells of this embodiment does not require visual observations by an inspector of the LCD cells which have been determined to be perfectly good or clearly poor in previous testing steps of an image data processor, an array tester, etc. but easily carries out judgment and inspections on the LCD cells which are necessary to subsequently check.

The testing steps may use an image data processor available on the market, a probe unit to supply LCD cells with the same test image patterns as the visual observations described above and a well known CCD camera to automatically detect display defects of the LCD cells. Those testing steps identify, categorize, and generate data on perfectly good LCD cells without any display defects, clearly poor ones with defect modes, or gray ones. For example, in the case that removable dust clings to the surface of an LCD cell and a test image pattern which is intrinsically not poor is detected, its judgment data are generated to indicate a gray one. It is understood that ordinary image data processing techniques are available for those skilled in the art to apply for generation of such judgment data.

The array tester includes a probe unit which supplies driving lines of a TFT array substrate with driving signals, detects electrical outputs from them and determines if the TFT array substrate has electrical defects. A market available array tester may be used for this purpose. Thus, the array tester generates judgment data on poor or gray LCD cells. Such judgment data per individual LCD cell are stored together with its serial number in a server 17 shown in FIG. 3.

Figure 5:
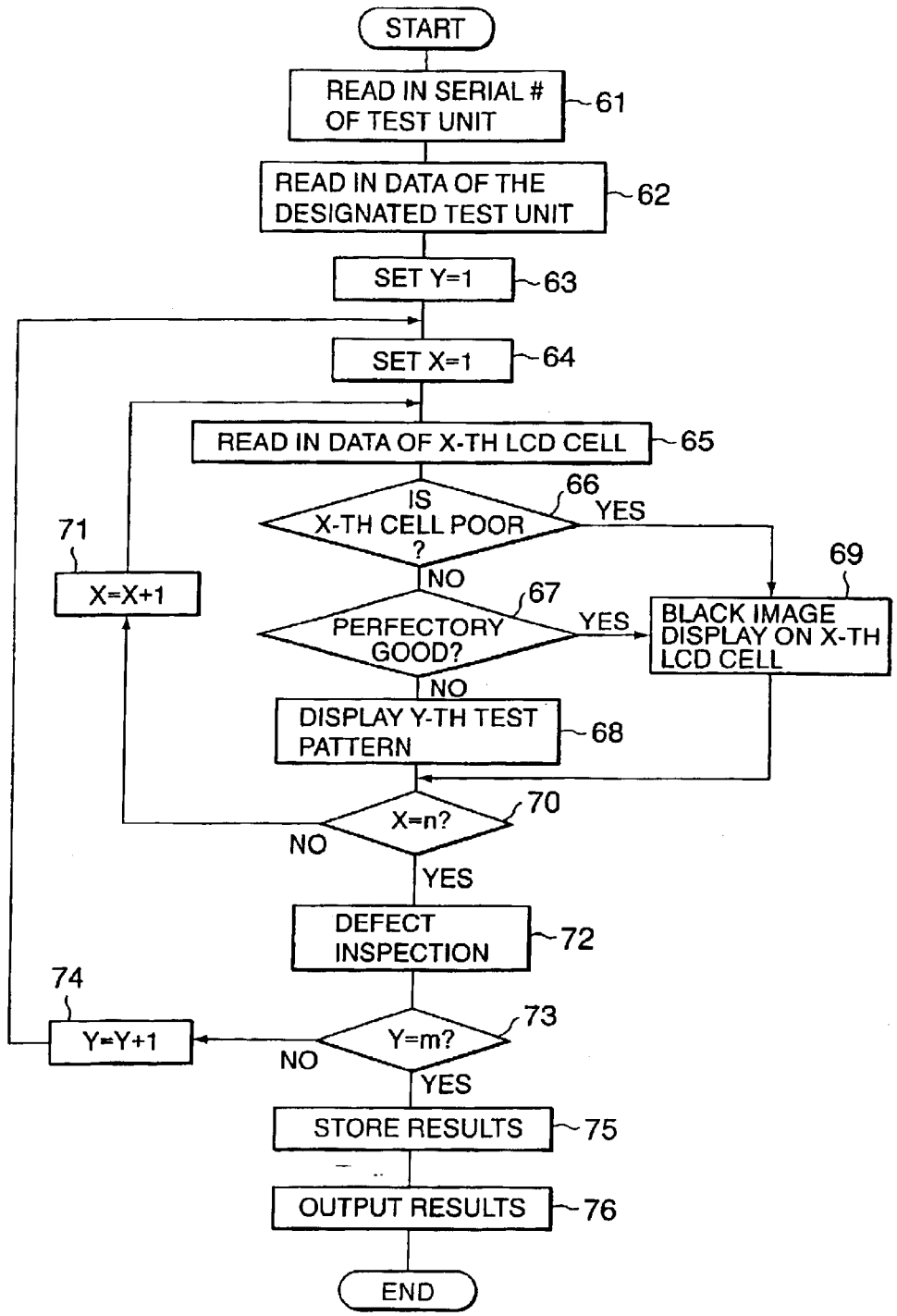
FIG. 5 is a flow chart of a method of testing LCD cells of another embodiment according to the invention.

Now, referring to FIGS. 2, 3 and 5, the test unit 3 of LCD cells is inserted into the inspection system 11 and a serial number system 12 detects a serial number of the test unit 3 at Step 61 and sends it to the control system 15. The control system 15 reads in judgment data on LCD cells with designated serial numbers from the server 17 through the input system 16 and stores the same in a built-in hard disc at Step 62. Similarly to the first embodiment, a first test image pattern and a first LCD cell are selected at Steps 63 and 64, respectively. The control system 15 reads out the judgment data for the first LCD cell from the hard disc at Step 65 and checks whether the data indicate a poor LCD cell at Step 66 or a perfectly good one at Step 67. If the LCD cell is not poor or perfectly good, a control signal is sent to the LCD cell drive control circuit 13 to generate the first test image pattern. On the other hand, if the judgment data indicate a poor or perfectly good LCD cell, another control signal is sent to the LCD cell drive control circuit 13 to generate a predetermined pattern (e.g., a black pattern) at Step 69. Then, "X=n?" is checked at Step 70, "X=X+1" is set at Step 71 and similar operations are repeated until the n-th LCD cell has been checked. The inspector carries out visual observations of the first LCD cell through the n-th LCD cell and judges whether the LCD cells have defects or not at Step 72. If LCD cells are judged to be perfectly good or clearly poor in the previous step and needs no further visual observations, the predetermined image pattern is displayed so that the inspector can easily recognize such perfectly good or perfectly poor LCD cells. Thus, she or he can skip or stop further examining them and inspect the remaining LCD cells in the test unit 3, so that the testing efficiency is significantly improved. The testing is repeated through executions of "Y=m?" and "Y=Y+1" at Steps 73 and 74 until the image test pattern of "Y=m" is completed. Then, test results are stored in the control system 15 and are also outputted to the server 17 at Steps 75 and 76, respectively.

It is understood that both data from the image data processor and the array tester are not necessarily required but either one of them is sufficient to achieve the objectives of the invention. The Step 72 for defect inspection can be substituted for the Steps 48 and 49 shown in FIG. 4 of the first embodiment. Since the second embodiment of the present invention can feed back both data from the screening system, e.g. the image data processor and/or array tester and the previous visual observation, its testing efficiency increases more significantly than the first embodiment.

For instance, when the test unit 3 of 13 LCD cells has been subjected to inspection, a conventional testing method to inspect each LCD cell separately could cover 600 LCD cells per day but the method of either first or second embodiment could cover 3,500 to 5,000 LCD cells per day. A greater testing efficiency has been achieved.

This invention may be practiced or embodied in still other ways without departing from the spirit or essential character of the invention. For instance, the hardware resources, such as the control system etc. may be the one well known by those skilled in the art. The LCD cells that may be inspected are not limited to TFT LCD cells but can also be simple matrix type LCD cells. As a matter of course, the number of LCD cells in the test unit and the predetermined image patterns are not limited to those set forth above in relation to the embodiments.

The present invention is suitable for inspection of a test unit of a plurality of LCD cells. When some LCD cells have been judged to function poorly, they display a specific image to indicate that no further inspections are required and an inspector can focus on examining the remaining LCD cells only. Since he or she can easily identify the former, the testing efficiency increases remarkably.

What is claimed is:

1. A method of testing liquid crystal display cells, comprising the steps of:

preparing a test unit of liquid crystal display cells;

displaying a test image pattern on said liquid crystal display cells;

judging from said test image pattern displayed on said liquid crystal display cells whether said liquid crystal display cells function poorly or good;

displaying a predetermined image pattern on one or more of said liquid crystal display cells which have been judged to function poorly in said judging step; and testing other liquid crystal display cells than said one or more of said liquid crystal display cells which display a test image pattern other than said test image pattern.

2. A method of testing liquid crystal display cells, comprising the steps of:

detecting an identification number of a test unit of liquid crystal display cells;

reading in judging data stored in a memory system whether said liquid crystal display cells with said identification number function perfectly good or poorly;

setting up said test unit at a liquid crystal display cell drive control system;

providing said liquid crystal display cell drive control system with control signals in response to said judging data;

stopping testing said perfectly good or poorly functioning ones of said liquid crystal display cells displaying a predetermined image pattern on said perfectly good or poorly functioning ones; and further testing other liquid crystal display cells than said perfectly good or poorly functioning ones displaying a test image pattern.

3. The method of testing liquid crystal display cells according to claim 2, further comprising the steps of supplying a control system with testing results of said testing step, said testing results indicating whether said good functioning ones of said liquid crystal display cells function poorly or not;

sending control signals in response to said testing results from said control system to said liquid crystal display cells which have been determined to function poorly in said testing step to display said predetermined image pattern;

further testing other liquid crystal display cells which have not been determined to function perfectly good or poorly and display other test image pattern than said test image pattern.

4. The method of testing liquid crystal display cells according to claim 2, further comprising the steps of:

electrically testing said test unit of said liquid crystal display cells; and storing testing results obtained from said electrically testing step in said memory system.

5. The method of testing liquid crystal display cells according to claim 2, further comprising the steps of:

image-processing testing said test unit of said liquid crystal display cells; and storing testing results obtained from said image-processing testing step in said memory system.

6. A liquid crystal display cell testing apparatus comprising:

an inspection system to drive and control a test unit of liquid crystal display cells;

a control system to send drive control signals to said test unit of liquid crystal display cells; and an input system to provide said control system with judging data as to whether said liquid crystal display cells function poorly or good;

wherein said control system sends said drive control signals in response to said judging data.

7. The liquid crystal display cell testing apparatus according to claim 6, further comprising:

a detection system to detect a serial number of said test unit;

wherein said input system read out said judging data with said serial number from said memory system and inputs the same to said control system.

* * * * *